Nov. 24, 1931. E. C. BAYNES 1,833,554
SCREW LOCKING DEVICE
Filed Nov. 3, 1930

INVENTOR
Edward C. Baynes
BY Francis D. Hardesty
ATTORNEY

Patented Nov. 24, 1931

1,833,554

UNITED STATES PATENT OFFICE

EDWARD C. BAYNES, OF BIRMINGHAM, MICHIGAN

SCREW LOCKING DEVICE

Application filed November 3, 1930. Serial No. 492,909.

This invention relates to locking elements adapted for use with screw fastening devices such as wood screws, machine screws, or the like.

An object of this invention is an element which can be inserted in the aperture of a member which is to be fastened to another, the element being so shaped as to receive the fastening device between its upstanding portions and cooperating with the latter to hold it in place in the aligned apertures of the members to be fastened, and thereby to hold the members to each other more securely.

A still further object is a locking element of the class described including a plate like portion, and a U shaped portion integral therewith or at least operatively associated therewith, the legs of the U shaped portion being so bent as to form, at least partially, a cylinder into which may be projected the fastening device. If desired, the internal surface of the cylinder may be ribbed or grooved by threads or the like, the ribs interlocking with the threads of the fastening device to hold the latter more securely in place.

Still other objects will readily occur to those skilled in the art upon reference to the following description and the accompanying drawings in which Fig. 1 is a sectional view thru members fastened to each other and showing the manner of use of the locking element forming the invention.

Figures 6, 7:
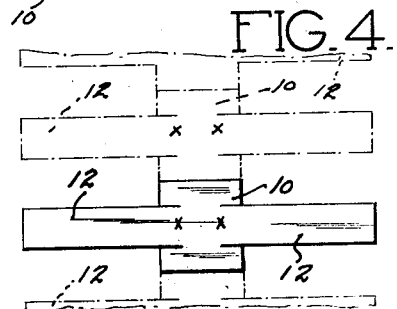
Fig. 6 shows a blank from which locking elements may be fashioned.
Fig. 7 is a top plan view of a strip of locking elements.

Referring to the drawings, Fig. 6 shows a blank comprising a plate-like portion 10 having wings 12 extending therefrom. The wings are bent up from the plate-like portion 10 on lines set in from the edge of the latter, the lines being indicated by the letter X.

Figures 3, 4, 5:
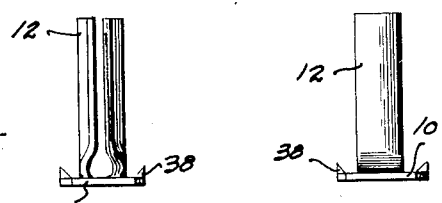
Fig. 3 is a front elevation view of the same.
Fig. 4 is a side elevation view of the same.
Fig. 5 is a section as if on the line 5—5 of Fig. 2.

The wings 12, after being bent upwardly, are bent longitudinally on the center of the plate-like portion as an axis, to form a pair of upstanding portions, each of which is semi-cylindrical in shape and which together form, at least partially, a cylinder. The internal surface of the cylinder may be provided with threads or ribs, as shown in Fig. 5 which form ribs for purposes to be described later.

Figure 1:
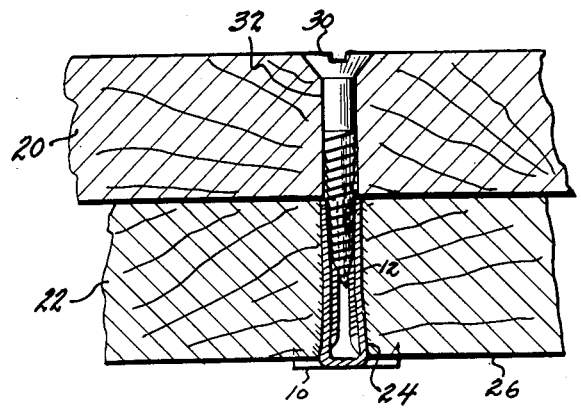
Figure 2:
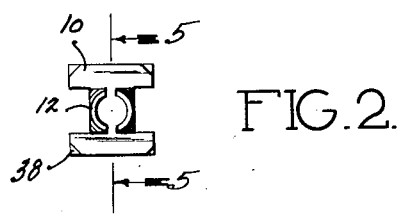
Fig. 2 is a top plan view of the locking element.

The modus operandi of the element described in the foregoing is disclosed best in Fig. 1. When two members, such as the planks or boards 20 and 22, are to be secured to each other, a hole 24 is provided in one of them, let us say, in member 22. The locking element is then positioned with its upstanding portions 12 in the bore 24 and with its plate-like portion resting against the surface of the member 22, it being understood, of course, that the external diameter of the cylinder formed by the portions 12 is such as to enable the locking element to be disposed within the member 22.

A screw fastening device, such as the wood screw 30, is then threaded into the locking element, such hole being formed by means of a drill, before the insertion of the member 30, or by the cutting action of the member 30 as it is threaded into the member 20. The screw 30 is threaded into the locking element and its threads will interlock with the internal threads or ribs of the latter, such interlocking causing the screw 30 to be held in its place more securely than would be the case if no locking element were provided.

Further, the parts may be so proportioned that when the screw 30 is threaded into the locking element, the upstanding portions of wings 12 are moved outwardly, slightly, so as to tend to crush the fibres of the member 22 around the bore 24. The fibres tend to resist such crushing action and accordingly tend to cause the wings 12 to hold the screw 30 more securely, just as a plier would in this case.

Accordingly, it will be seen that there has been provided a simple locking element which cooperates with a screw fastening device in the manner specified.

Further, it will be seen that the wings 12, while shown as integral with the plate-like portion 10, may be made part of a U-shaped member non-integral therewith. The plate-like portion will serve as a washer and as a means to prevent the U-shaped portion from being drawn into the bore too far. However, for economy of manufacture, it is preferred to make the U-shaped portion and the plate-like portion integral and such modification will be termed the elected modification.

Further, if desired, spurs or tongues may be cut out of or punched out from the wings 12 to bite into the portion 22 when the locking element is disposed in the bore 24, such spurs or tongues serving to prevent withdrawal of the locking element from the bore 24, as will be seen.

Further, the plate-like portion may be provided with locking corners, bent up from the plate, as at 38.

Figure 8:
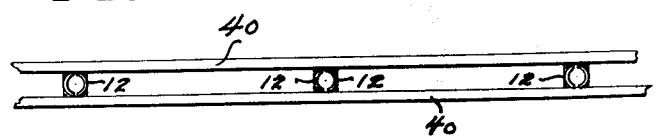
Fig. 8 is a front elevation view of the same.

If desired, a number of elements may be joined to one another, as shown in Figs. 7 and 8. The wings 12 may be bent up from a long strip 40, at desired intervals, as shown. Further, a strip of elements, such as is shown in blank in Fig. 6, may have the portions 12 bent up transversely of the strip, all of the portions 10 being unsevered from one another.

Further, the wings 12 may be bent inwardly, adjacent the plate 10, to cause the element to have a spring action, the wings 12 tending to resist their being spread, by and upon insertion of the screw.

Figure 9:
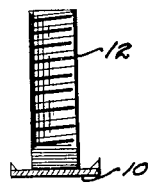
Fig. 9 shows a modification.

In Fig. 9, one of the wings 42 is shown as bent over the other 43, the horizontal part 44 of wing 42 having a hole thru which the bolt 45 projects and into which the upper end of wing 43 extends. This form is intended for use where the wings themselves, unaided by aperture walls, must resist the spreading action of the bolt as for example, where the locking element is positioned in a large hole 48 in member 50.

Now having described the invention and the preferred embodiment thereof, it is to be understood that the said invention is to be limited, not to the specific details herein set forth, but only by the scope of the claim which follows:—

What I claim is:—

In combination with an apertured support of a material such as wood, a headed fastening screw disposed at least partially in said aperture and a screw locking element comprising a plate-like portion disposed on that side of the member opposite the side nearer the screw head and having prongs bent up from the corners of the plate and embedded in the wood support, and also having upstanding portions integral with and bent up from the sides of said plate-like portion between the corners and disposed in said aperture, the upstanding portions having stamped internal threads and being bent up as to form only partially a hollow, internally threaded, multi-split cylinder whose internal diameter is substantially equal to the diameter of the fastening screw, and whose external diameter is initially greater than that of the aperture in which it is disposed.

EDWARD C. BAYNES.